United States Patent [19]

Brown

[11] Patent Number: 4,600,111

[45] Date of Patent: Jul. 15, 1986

[54] TODDLER CUP

[76] Inventor: Mary F. Brown, 301 W. Vilbig Rd., Irving, Tex. 75060

[21] Appl. No.: 733,266

[22] Filed: May 13, 1985

[51] Int. Cl.[4] ........................ A47G 19/22; A47J 41/00; A61J 9/00; B65D 23/12

[52] U.S. Cl. ........................................ 215/6; 215/11 R; 215/13 R; 215/100 R; 220/20; 220/85 R; 220/90.2

[58] Field of Search ..................... 215/6, 100 R, 11 C, 215/12 A, 13 R, 1 R, 11 R; 220/90.2, 90.4, 20, 85 CH, 85 R

[56] References Cited

U.S. PATENT DOCUMENTS

| | | | |
|---|---|---|---|
| 730,337 | 6/1903 | Bonnefont | 215/6 |
| 1,243,033 | 10/1917 | Beatty | 215/229 |
| 1,728,883 | 9/1929 | Simon | 215/6 |
| 1,811,286 | 6/1931 | Tyndall | 215/100 R X |
| 2,569,139 | 9/1951 | Abelson | 220/90.2 X |
| 2,787,395 | 4/1957 | Florio | 215/100 R |
| 2,816,548 | 12/1957 | Tupper | 220/90.4 X |
| 2,843,281 | 7/1958 | Gallois | 215/6 X |
| 2,876,692 | 3/1959 | Gaisman | 215/1 R X |
| 4,076,139 | 2/1978 | Larson | 215/11 C |
| 4,078,686 | 3/1978 | Karesh | 215/6 |
| 4,339,046 | 7/1982 | Coen | 215/11 B |
| 4,429,786 | 2/1984 | Hucal | 206/5.1 |
| 4,444,324 | 4/1984 | Grenell | 215/6 |
| 4,448,316 | 5/1984 | Hiroshige | 215/1 A |

FOREIGN PATENT DOCUMENTS

| | | | |
|---|---|---|---|
| 117191 | 6/1943 | Australia | 215/1 R |

*Primary Examiner*—William Price
*Assistant Examiner*—Sue A. Weaver
*Attorney, Agent, or Firm*—Hubbard, Thurman, Turner & Tucker

[57] ABSTRACT

A toddler drinking cup for use by a small child or an infant. The drinking cup includes a cylinder separated by a partition into a first compartment for retaining and storing liquid and a second compartment for temporary storage of extra lids. Lids adapted for various purposes are utilized to cover the aperture of the first compartment. The second compartment houses the remaining lids for temporary storage, and includes a screw cap to retain the remaining lids therein.

19 Claims, 3 Drawing Figures

TODDLER CUP

BACKGROUND OF THE INVENTION

1. Field of the Invention

This invention relates in general to a liquid drink container with various lids, and in particular to such containers wherein the lids may be temporarily stored in a separate compartment within the container.

2. Description of the Prior Art

Containers with more than one compartment are known in the prior art. For example, U.S. Pat. No. 4,078,686, issued to Karesh, discloses a two way jar for containing two different liquids. U.S. Pat. No. 4,339,046, issued to Coen, reveals a threaded cap at the bottom of a container for easy access to a liquid retaining bag piston. These devices have threaded caps at both ends, but are not suited for use with a plurality of differing lids. One patent, U.S. Pat. No. 4,429,786, issued to Hucal, discloses the technique of stacking container assemblies in tandem; this merely presents the concept of compartmentalization of several modules. Other patents, such as U.S. Pat. Nos. 4,076,139, issued to Larson, and 4,448,316, issued to Hiroshige, disclose containers which incorporate specialized lids. The Larson device is merely an insulating container for a bottle, and the Hiroshige invention reveals only a straw-equipped spout. Finally, U.S. Pat. No. 1,243,033, issued to Beatty, teaches a particular lid. As one skilled in the art will appreciate, none of these inventions utilize a plurality of lids, nor do they have a compartment in which multiple lids may be temporarily stored.

SUMMARY OF THE INVENTION

Accordingly, the primary object of the present invention is to provide a drinking cup which may utilize a plurality of different lids.

Another object of the invention is to provide a drinking cup which permits storage of extra lids within the cup itself.

Still another object of the invention is to provide a drinking cup which permits eacy access to the lid storage area.

Yet another object of the invention is to provide a drinking cup which permits storage of extra lids within the cup itself and which minimizes the amount of space necessary for storage of extra lids.

It is also an object of the invention to provide a drinking cup with accompanying lids which facilitate utilization by young children.

The foregoing objects are achieved in a toddler drinking cup which comprises a cylindrical member open at each end, and which includes a partition within the cylindrical member which divides the cylinder into two compartments. The drinking cup includes a plurality of lids each adapted to fit over one end of the cylinder. The lids may also be placed within the other end of the cylinder. A screw cap or cover may be utilized to store extra lids within the lower compartment.

Preferred embodiments of the invention may include insulating means for maintaining the liquid at a relatively constant temperature. The cylindrical member is preferably partitioned so as to provide a liquid storage compartment which is substantially larger than the lid storage compartment. The lids each preferably provide a leak proof seal. The various lids may include a simple disk which totally seals the liquid storage compartment, a disk with a small aperture for inserting a straw into the cylinder, and a lid with a small spout or nipple for facilitating drinking by a yound child. The cylinder may also be constructed with a handle or other gripping means.

BRIEF DESCRIPTION OF THE DRAWINGS

The novel features believed characteristic of the invention are set forth in the appended claims. The invention itself, however, as well as a preferred mode of use, further objects and advantages of, will best be understood by reference to the following detailed description of an illustrative embodiment when read in conjunction with the accompanying drawings, wherein:

DESCRIPTION OF THE PREFERRED EMBODIMENTS

Figure 1:
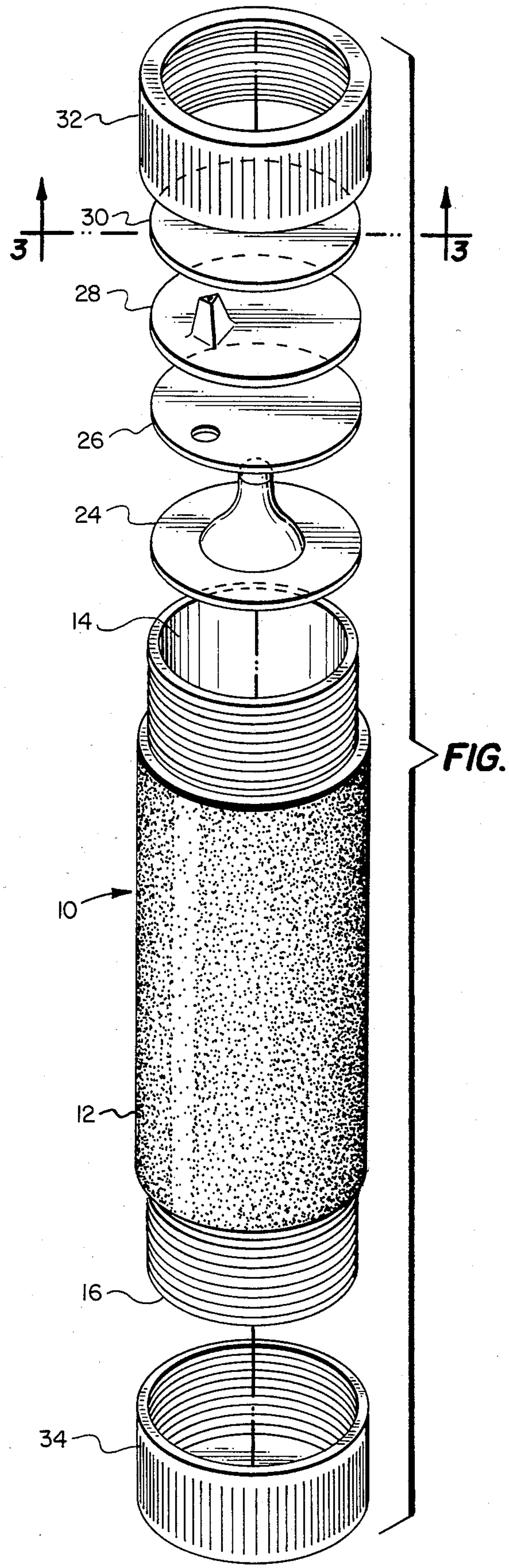
FIG. 1 is an exploded view of the toddler cup of the present invention.
Figure 3:
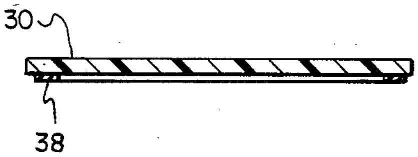
FIG. 3 is a cross sectional view of the sealing lid showing the gasket material.

With reference now to the figures and in particular with reference to FIG. 1, there is depicted an exploded view of toddler cup 10 of the present invention. Toddler cup 10 includes a cylindrical member 12 with apertures 14 and 16 at either end; a plurality of sealing lids, 24, 26, 28, and 30; lid cover member 32, and cap member 34. Toddler cup 10 may be constructed, in a preferred embodiment, of plastic, wood, glass, or any other material of suitable rigidity.

Sealing lid 24 comprises a radial disk fitted with a plastic or rubber nipple for utilization by an infant. Sealing lid 26 comprises a radial disk with a small aperture to provide for insertion of a straw into cylindrical member 12. Sealing lid 28 comprises a radial disk with an extended spout to facilitate drinking and sealing lid 30 comprises a radial disk for providing a complete seal of aperture 14. Of course, those skilled in the art will appreciate that alternative lids for various other purposes may be used in accordance with the present invention. In an alternative embodiment, each sealing lid may contain at the radial perimeter a resilient sealing material or gasket 38 comprised of rubber, foam, or other suitable material, for providing additional assurance of a leak proof seal. Lid cover member 32 fits over any selected sealing lid and threadingly mates with cylindrical member 12 to provide compressive contact between a selected sealing lid and cylindrical member 12.

Lid cover member 32 includes an aperture of sufficient diameter through which a selected sealing lid may be utilized. Lid cover member 32 also preferably includes a threaded gripping surface to facilitate the exertion of manual torque, as those skilled in the art will appreciate. Cap member 34 threadingly mates with cylindrical member 12 over aperture 16 for temporary storage of a plurality of extra lids within cylindrical member 12. Cap member 34 also preferably contains a threaded gripping surface to facilitate exertion of manual torque.

Figure 2:
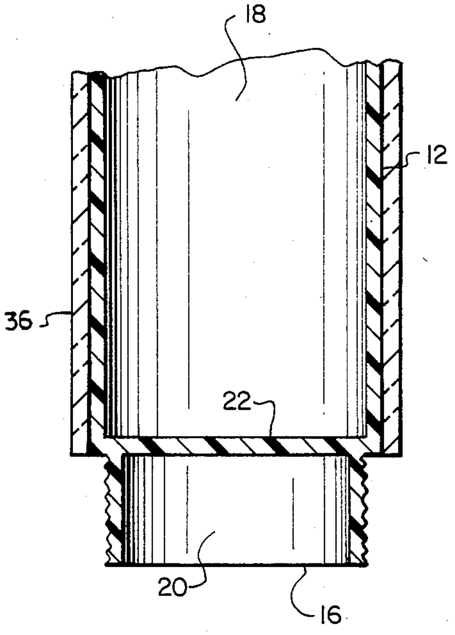
FIG. 2 is a cross sectional view of the toddler cup of the present invention showing the partition separating the first compartment liquid retaining area from the second compartment storage area.

With reference now to FIG. 2, there is depicted a cross sectional view of the novel toddler cup 10 of the present invention. As depicted, partition 22 divides cylindrical member 12 into two compartments, first compartment 18 and second compartment 20, which are accessed through apertures 14 and 16, respectively. First compartment 18 in the preferred embodiment is substantially larger than second compartment 20, and first compartment 18 is preferably used for containing liquid. Second compartment 20 is designed to retain a plurality of sealing lids for temporary storage.

Cylindrical member 12 may, in an alternative embodiment, include suitable insulating materials 36 for maintaining the contents at a relatively constant temperature. As those skilled in the art will appreciate, cylindrical member 12 may also be constructed to include a handle or other gripping means.

Although the invention has been described with reference to a specific embodiment, this description is not meant to be construed in a limiting sense. Various modifications of the disclosed embodiment, as well as alternative embodiments of the invention will become apparent to persons skilled in the art upon reference to the description of the invention. It is therefore contemplated that the appending claims will cover such modifications that fall within the true scope of the invention.

What is claimed is:

1. A toddler drinking cup comprising:

a cylindrical member having an aperture at each end thereof;

a partition disposed within said cylindrical member, dividing said cylindrical member into a first compartment accessible through a first aperture, and a second compartment accessible through a second aperture;

a plurality of sealing lids each adapted to mate with said first aperture of said cylindrical member and adapted to fit within said second compartment of said cylindrical member;

a cap member for retaining said plurality of sealing lids within said second compartment, whereby said plurality of sealing lids are to be temporarily stored therein; and wherein said drinking cup includes a lid cover member for retaining a selected one of said plurality of sealing lids in mated relationship with said first aperture of said cylindrical member.

2. A toddler drinking cup according to claim 1 wherein said cylindrical member includes thermal insulation means for maintaining liquid in said first compartment at a constant temperature.

3. A toddler drinking cup according to claim 1 wherein said first compartment is substantially larger in longitudinal dimension than said second compartment.

4. A toddler drinking cup according to claim 1 wherein said plurality of sealing lids each include at the radial perimeter a sealing material for providing a leak tight seal between said first aperture and said sealing lid.

5. A toddler drinking cup according to claim 1 wherein said cap member threadingly mates with said second compartment.

6. A toddler drinking cup according to claim 1 wherein said cylindrical member contains gripping means for non-slip manual use.

7. A toddler drinking cup according to claim 1, wherein one of said plurality of sealing lids comprises a radial disk for preventing liquid from exiting said first compartment.

8. A toddler drinking cup according to claim 1 wherein one of said plurality of sealing lids includes a radial disk with an aperture substantially smaller in diameter than the radial disk.

9. A toddler drinking cup according to claim 1 wherein one of said plurality of sealing lids includes a radial disk with an extended spout.

10. A toddler drinking cup according to claim 1 wherein one of said plurality of sealing lids includes a radial disk with a rubber nipple for use by an infant.

11. A toddler drinking cup comprising:

a cylindrical member having an aperture at each end thereof;

a non-porous partition disposed within said cylindrical member dividing said cylindrical member into a first compartment accessible through a first aperture, and a second compartment accessible through a second aperture;

a plurality of sealing lids each adapted to mate with said first aperture by compressive contact with said cylindrical member, and adapted to fit within said second compartment of said cylindrical member for storage;

a lid cover member for retaining a selected one of said plurality of sealing lids in mated, leak tight relationship with said cylindrical member at said first aperture, with threading means for providing compressive contact of said sealing lid with said cylindrical member and an aperture to permit exposure and functional use of said sealing lid;

a cap member for retaining said plurality of sealing lids within said second compartment where said plurality of sealing lids are to be temporarily stored, by threadingly mating to said cylindrical member.

12. A toddler drinking cup according to claim 11 wherein said cylindrical member includes thermal insulation means for maintaining liquid in said first compartment at a constant temperature.

13. A toddler drinking cup according to claim 11 wherein said first compartment is substantially larger in longitudinal dimension than said second compartment.

14. A toddler drinking cup according to claim 11 wherein said plurality of sealing lids each include at the radial perimeter a sealing material for providing a leak tight seal between said first aperture and said sealing lid.

15. A toddler drinking cup according to claim 11 wherein said cylindrical member contains gripping means for non-slip manual use.

16. A toddler drinking cup according to claim 11 wherein one of said plurality of sealing lids comprises a radial disk for preventing liquid from exiting said first compartment.

17. A toddler drinking cup according to claim 11 wherein one of said plurality of sealing lids includes a radial disk with an aperture substantially smaller in diameter than the radial disk.

18. A toddler drinking cup according to claim 11 wherein one of said plurality of sealing lids includes a radial disk with an extended spout.

19. A toddler drinking cup according to claim 11 wherein one of said plurality of sealing lids includes a radial disk with a rubber nipple for use by an infant.

* * * * *